Nov. 18, 1947.  A. WIKSTROM  2,431,154
CABLE SECURING DEVICE
Filed March 28, 1946
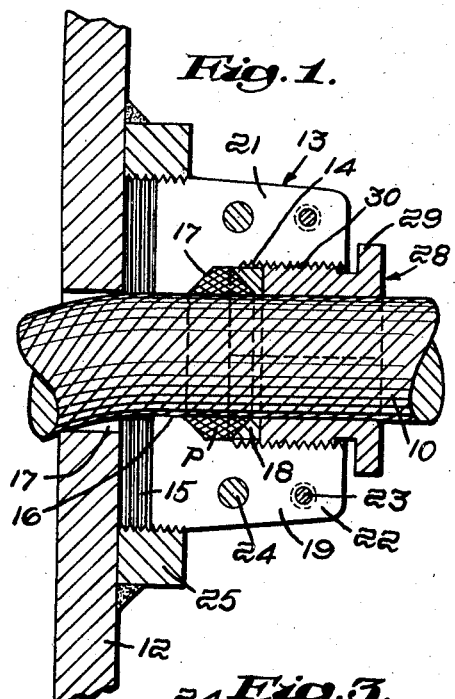
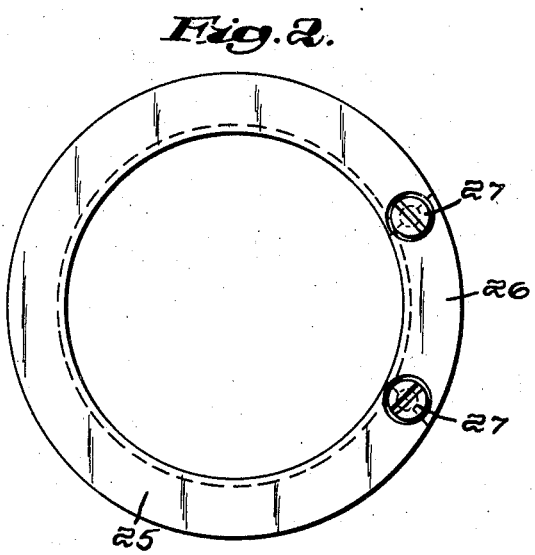
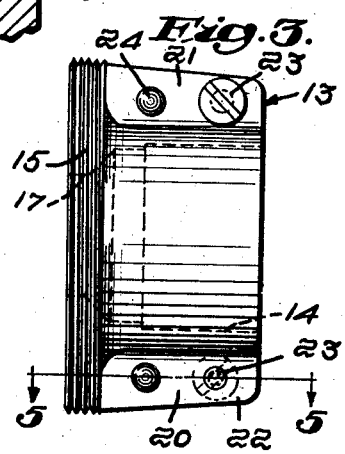
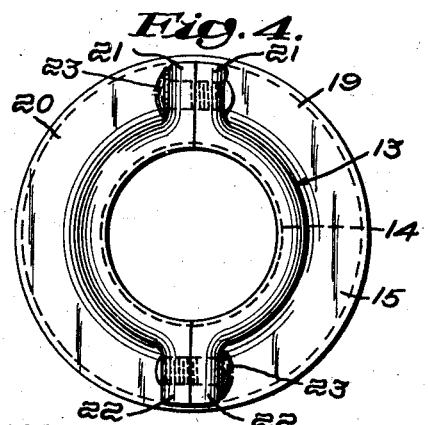
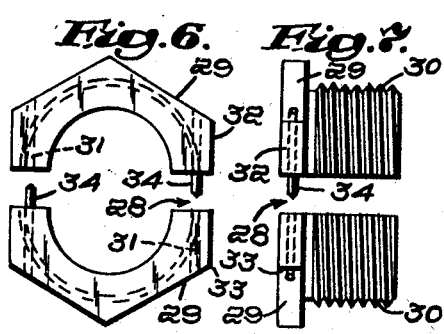
Inventor:
Alfred Wikstrom,
by Spear & Spear
Attorneys Patented Nov. 18, 1947

2,431,154

UNITED STATES PATENT OFFICE 2,431,154

CABLE SECURING DEVICE

Alfred Wikstrom, Newcastle, Maine, assignor to Bay Shore Machine Company, Inc., Newcastle, Maine, a corporation of Maine Application March 28, 1946, Serial No. 657,668

7 Claims. (Cl. 285—6.5)

My present invention relates to cable securing devices for use in sealing an aperture in a bulkhead or the like through which the cable extends.

While my invention is adapted to other uses, its use in connection with the installation or the repair of cables in ships well illustrates the problems involved and the novel features and advantages of my invention. Where a cable passes through a bulkhead, it is obviously essential that means be employed to tightly seal it against water leakage.

It has been the practice to employ, for such a purpose, a device consisting of first and second elements each of which comprised first and second sections to permit the elements to be assembled about the cable. The first and second sections of the first element, when assembled, established an interiorly threaded tube and a base that was attached to the bulkhead by screws or by welding. Each of the tube forming portions of the sections of the first element had longitudinally disposed marginal flanges and when the first element was assembled, the two pairs of engaging flanges were interconnected. This was effected by means of screws which passed freely through one flange of each pair and were threaded into the other flange of that pair.

The base establishing portions of the sections of the first element were so formed that when the first element was assembled, a cable receiving aperture was established of less size than the inside diameter of the threaded tube, thereby providing a seat against which suitable packing material and packing ring sections were seated by the second element, the first and second sections of which were so formed that when assembled about the cable, the second element had a nut portion and a threaded portion to be threaded into the tube to compress the packing material.

Such devices were unsatisfactory because of the extreme difficulty usually experienced in using them due to the fact that on assembly of either or both of the elements, their threads were not properly alined so that completion of the installation was virtually impossible. The misalinement of the threads of the first element resulted from the fact that the screws which locked together the pairs of flanges passed freely through one flange of each pair making possible a slight relative longitudinal movement between the sections of the first element. Such movement, with resulting misalinement of the threads, might be due to any such factors as careless assembly, an uneven bulkhead surface, slight distortion resulting from welding, a slight bend or kink in the cable, or to the fact that the workman had to operate in a place that was not readily accessible.

As the two sections of the second element were not united, except as they were loosely bound together by wire, a workman had considerable difficulty in threading the second element into the tube of the first element even under favorable conditions as in trying to start the threaded portion of the second element into the threaded tube, it was very difficult to avoid relative longitudinal movement between the sections of the second element.

In use, if the threads of an assembled second element could not be properly started, they soon became damaged requiring the use of a new second element. Where the threads of the tube of the first element were themselves not in alinement, nothing could be done except to remove the first element and as its threads were frequently damaged, it, too, had to be replaced with the result that the sealing of cables extending through bulkheads was both costly and time consuming.

In accordance with my invention, I eliminate these difficulties by ensuring that the threads of the different elements are properly alined when they are assembled about the cable. In brief, I employ first and second elements which may have the general characteristics of the first and second elements of the prior devices except that I provide means ensuring the positive alinement of their threads when their sections are assembled about the cable.

In accordance with my invention, when the first element is assembled about the cable, centering pins position each pair of flanges so that when fastened together by screws, the threads on its base and in its tube are positively alined. Preferably, I provide the first element with a detachable flange in the form of a ring threaded to the base. The ring has a removable section to permit it to be assembled about an installed cable and while it may be attached to the bulkhead by screws, it is preferably welded thereto as the first element may be quickly and easily detached therefrom if service or repair is required.

In practice, the ring and the first element are separately assembled around the cable and as the threads of the first element when thus assembled are accurately alined, its base may be easily threaded into the ring and the ring may then be welded to the bulkhead. The second element is then assembled about the cable and threaded into the tube. In accordance with my invention, the head establishing portions of the sections of the second element are formed with mating pins and recesses which hold the sections tightly together with the threads properly alined so that the second element may be easily threaded into the tube to properly seat the packing.

In the accompanying drawings, I have shown an illustrative embodiment of devices in accordance with my invention from which its novel features and advantages will be readily apparent.

In the drawings:

Fig. 1 is a partly sectioned view of an installed device in accordance with my invention.

Fig. 2 is a plan view of the interiorly threaded ring.

Fig. 3 shows the first element in side view.

Fig. 4 is a top plan view of the first element.

Fig. 5 is a fragmentary section along the lines 5—5 of Fig. 4.

Fig. 6 is a top plan view of the sections which, when assembled, establish the second element of my device, and Fig. 7 is a side view of the sections shown in Fig. 6.

In the drawings, I have shown a preferred embodiment of my invention for securing the cable 10 and sealing the aperture 11 in the bulkhead 12 through which it passes so that the bulkhead is rendered watertight.

In accordance with my invention, the first element, generally indicated at 13, has an interiorly threaded tube portion 14 and an exteriorly threaded base 15 having an aperture 16 for the cable 10, the diameter of which is less than the inside diameter of the tube portion 14. An internal annular shoulder 17, preferably tapering inwardly and downwardly at an angle of 45°, is thus established against which a suitable packing, generally indicated at P, may be seated. A split gland ring 18 is shown as having its packing contacting face outwardly tapering at an angle of 45°.

The first element 13 is formed with a pair of diametrically opposed ribs extending the length of the tube portion 14 and tapering slightly upwardly and inwardly from the outer edge of the base 15. In practice, the element is longitudinally severed through the ribs to establish a pair of like sections 19 and 20, each of which has marginal flanges 21 and 22. The flanges are then drilled to establish on the assembly of the sections at least two alined transverse passages through each pair of flanges. One of the apertures in one of each pair of flanges is tapped so that when the sections are assembled about the cable, the flanges may be interlocked by screws 23. As slight relative longitudinal movement is possible between the sections even when clamped together by the screws 23 due to the fact that the apertures through which they pass are threaded in only one of the flanges, I employ centering pins 24, the taper of which is exaggerated in Fig. 5, in the other apertures of the flanges. The element 13 established by assembling the sections and interlocking the pairs of flanges is then completed by threading the tube portion 14 and the base 15, and, because of the means employed to interlock the flanges, proper thread alinement is ensured when the element 13 is re-assembled.

In accordance with the preferred embodiment of my invention, the first element 13 has a detachable flange comprising an internally threaded ring 25. While the ring 25 may be secured to the bulkhead 12 in any suitable manner, I have indicated it in Fig. 1 as welded thereto. In order that the ring 25 may be assembled about the cable 10, I have shown it as having a removable section 26 defining a minor arc dimensioned to provide a gap at least equal to the diameter of the cable 10. Before the ring 25 is cut to establish the section 26, it is drilled and tapped to receive the screws 27 and then cut along lines intersecting the drilled and tapped holes. By this construction, the section 26 may be easily removed or replaced to permit the ring 25 to be assembled about an installed cable.

In practice, the ring 25 and the first element 13 are separately assembled about the cable 10. Because of the use of the centering pins 24, the threaded portions of the element 13 are properly maintained in alinement on assembly and the ring 25 and the first element 13 may be readily threaded together so that the ring 25 constitutes additional means for holding the sections of the element 13 together in proper relation. The resulting assembly is then secured to the bulkhead 12 as by welding it thereto and the packing material is next disposed in the tube portion 14.

The installation is then completed by assembling the second element, generally indicated at 28, about the cable 10 and threading it into the tube portion 14 to compress the packing material 18 against the shoulder 17 to establish an effective seal. In accordance with my invention, the second element 28 has a nut-shaped head 29 and a threaded extension 30 to be threaded into the tube portion 14. I transversely drill the head 29 to establish a pair of bores 31 thereacross and then sever the element 28 to establish two sections 32 and 33. In one of the bores 31 in each section, I insert a pin 34 to enter the corresponding bore 31 in the other section so that on assembly the two sections 32 and 33 are interlocked securely and the threads on each section are held in alinement.

In accordance with my invention, I provide means for rendering devices for securing cables to bulkheads and for sealing the passages through which they extend easy to install, thus eliminating the wastage of material and time that unavoidably resulted from the use of devices prior to my invention.

What I therefore claim and desire to secure by Letters Patent is:

1. A cable securing device for use in sealing the aperture in a bulkhead through which the cable extends, said device comprising a first pair of sections including portions which establish, when assembled, a first element having an internally threaded tube, two pairs of engaging flanges, and an externally threaded base, means interlocking each pair of flanges with the corresponding threads with which the sections are found in alinement, and an internally threaded ring attached to said base, said ring comprising first and second arcuate portions, and means interlocking said portions.

2. The device of claim 1 in which the first portion of the ring defines a major arc, the second portion defines a minor arc, the abutting edges of each of the portions have a complemental threaded recess establishing when the first and second portions are assembled a pair of threaded passages, and a screw threaded in each passage to interlock the portions.

3. A cable securing device for use in sealing the aperture in a bulkhead through which the cable extends, said device comprising a first pair of sections including portions which establish, when assembled, a first element having an internally threaded tube and an externally threaded base, the tube forming portions of said sections including marginal flanges, corresponding pairs of which are in engagement on assembly, each pair of flanges having first and second bores in alinement when the threads with which the sections are provided are in alinement, a centering pin in one of the alined bores of each pair of flanges ensuring thread alinement, a screw in the other alined bore, that part of said other bore in one of the flanges being threaded to receive said screw, a flange threaded on said base, and a second pair of sections including portions which establish when assembled a second element having a nut-like head and a threaded extension to be threaded into said tube, the head establishing portions each having a bore and a projection spaced therefrom and disposed to interlock when said second element is assembled.

4. A cable securing device for use in sealing the aperture in a bulkhead through which the cable extends, said device comprising a first pair of sections including portions which establish, when assembled, a first element having an internally threaded tube and an externally threaded base, the tube forming portions of said sections including marginal flanges, corresponding pairs of which are in engagement on assembly, means interconnecting said pairs of flanges and positively alining the threads with which the sections are provided, an interiorly threaded flange threaded on said base and being adapted to be secured to said bulkhead, and a second pair of sections including portions which establish, when assembled, a second element having a nut-shaped head, a threaded extension to be threaded into said tube to complete the device, and means interlocking the head establishing portions of said sections to aline the threads with which the sections are formed.

5. A cable securing device for use in sealing the aperture in a bulkhead through which the cable extends, said device comprising a first pair of sections including portions which establish, when assembled, a first element having an internally threaded tube and a base, the tube forming portions of said sections including marginal flanges, corresponding pairs of which are in engagement on assembly, means interconnecting each pair of flanges and positively alining the threads with which the sections are provided, and a second pair of sections including portions which establish, when assembled, a second element having a nut-shaped head and a threaded extension to be threaded into said tube.

6. The device of claim 5 and means interlocking the nut-shaped head establishing portions of the sections to aline the threads with which the sections are formed.

7. A device comprising a pair of sections including portions establishing, when assembled, a nut-shaped head and a threaded extension, each of the head establishing portions of said section having a projecting pin and a pin receiving bore spaced therefrom to interlock the sections when assembled.

ALFRED WIKSTROM.

REFERENCES CITED

The following references are of record in the file of this patent:

UNITED STATES PATENTS

| Number | Name | Date |
|---|---|---|
| 919,913 | Miller | Apr. 27, 1909 |
| 1,284,159 | Sickman | Nov. 5, 1918 |